Feb. 11, 1958   KARL-HEINZ KÜPPERS   2,822,767
SLAG TAP FURNACE
Filed June 1, 1953
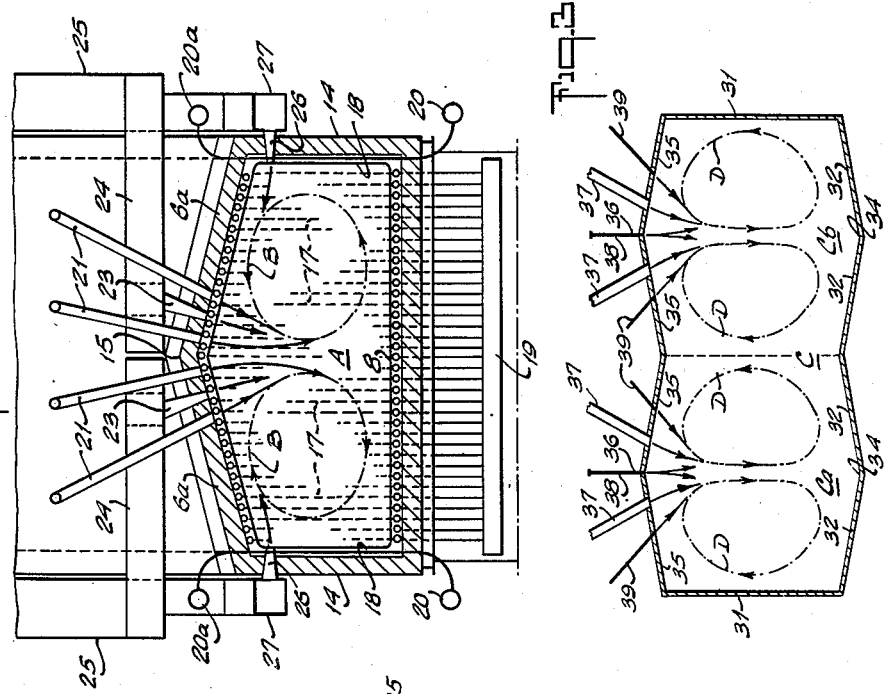
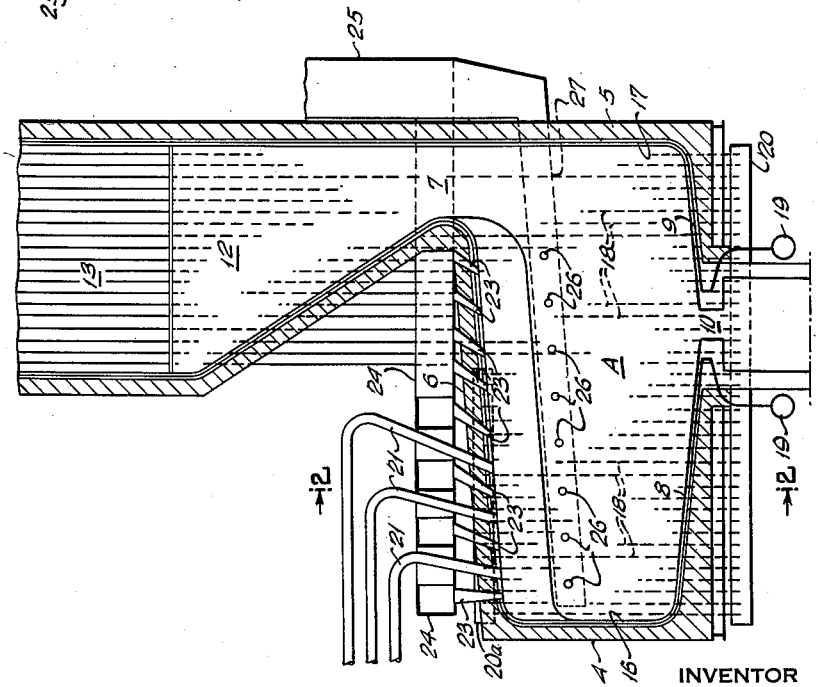
INVENTOR
KARL-HEINZ KÜPPERS
BY
*J. P. Moran*
ATTORNEY

United States Patent Office 2,822,767
Patented Feb. 11, 1958

2,822,767

SLAG TAP FURNACE

Karl-Heinz Küppers, Oberhausen, Rhineland, Germany, assignor to The Babcock & Wilcox Company, New York, N. Y., a corporation of New Jersey Application June 1, 1953, Serial No. 358,649

7 Claims. (Cl. 110—28)

The present invention relates to the construction and operation of fuel burning apparatus and more particularly to the construction and operation of furnaces arranged for the burning of ash-containing solid fuels at temperatures above the fuel-ash fusion temperature whereby a substantial proportion of the fuel ash is recoverable in the form of molten slag for continuous discharge from the furnace combustion chamber. Slagging furnaces of this general character have heretofore been fired with fuel burners disposed in a row and each arranged to discharge a fuel-air mixture in a whirling stream along the axis of the burner. Thus, with all burners of the same form, and closely spaced, the fuel-air streams discharging from successive burners have a common direction of rotation so as to result in the streams from adjacent burners having contacting marginal portions which flow in opposite directions, thereby causing a portion of the flow energy to be dissipated and thus interfering with the rotational movement of the streams. Such an arrangement of burners is permissible for the firing of pulverized fuel when the slag is discharged in a dry solid state since the slag is generally discharged parallel to the axes of flame rotation for the respective burners.

However, in the structure herein disclosed, an object is to maintain the burning fuel-air streams in contact with walls of the combustion chamber so that the slag will adhere to the walls and then flow downwardly along the walls to the lowermost point in the furnace. Accordingly, the flame is maintained in contact with large areas of the surrounding combustion chamber walls, corresponding to the manner of operating a cyclone furnace of the type shown, for example, in U. S. Patent 2,594,312. Therefore, in order to achieve approximately the same effect as in a cyclone furnace, as far as the discharge of slag is concerned, the present invention contemplates an arrangement of burners which results in the formation of vortiginous flame bodies within a single combustion chamber and with the fuel-air streams from each two adjacent burners rotating in opposite directions about parallel axes so as to result in an equidirectional flow of adjacent fuel-air streams at the mutually contacting points.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which certain specific embodiments of the invention are illustrated and described.

Of the drawings:

Fig. 1 is a side elevational view, in vertical section, of a slag tap furnace constructed in accordance with the invention;

Fig. 2 is an end view of the same furnace, in vertical section along line 2—2; and Fig. 3 is a diagrammatic vertical section, similar to Fig. 2, showing a modified furnace arrangement.

The illustrative embodiment of the invention thus comprises a furnace structure which provides in its lower portion a combustion chamber A which in vertical cross section, as viewed from one side, is of wedge-shaped formation, as seen in Fig. 1; and, as viewed from one end, is of symmetrical pentagonal formation about a vertical axis, as seen in Fig. 2. The chamber A is thus defined in part by front and rear upright walls 4 and 5 respectively; and by an upper inclined wall or roof 6 which slopes upwardly toward rear wall 5 and which terminates in spaced relation to wall 5 to define therewith a gas outlet passage 7. The bottom wall of chamber A is formed by oppositely inclined floor portions 8 and 9 which define therebetween a bottom slag outlet 10 at a location forwardly of the gas outlet 7. Gases discharging through outlet 7 are directed through an upwardly expanding flue 12 and thence into and through an upper radiation chamber 13 where the gases are brought into heat transfer relation to fluid conducting tubes of an associated vapor generator, not shown.

As seen in Fig. 2, the opposing furnace side walls 14, 14 are vertically disposed and parallel, and the upper wall or roof 6 is formed with oppositely inclined portions 6a, 6a which slope upwardly in symmetrical arrangement toward a central ridge 15. The width of chamber A between side walls 14 is thereby considerably greater than its height between the floor 8, 9 and roof 6. At the throat passage 7, the inner end of roof 6 is curved upwardly to form the front wall of throat 7, and then inclined upwardly and forwardly to define with rear wall 5 the upwardly expanding gas passage 12. All furnace walls, as thus identified, are fluid cooled and formed with fluid conducting tubes 16, 17 and 18 suitably arranged and connected to lower and upper headers which include, for example, headers 19, 20 and 20a.

Fuel is delivered to combustion chamber A through burner nozzles 21 which extend through the roof portions 6a. The fuel introduced through the respective nozzles is suitably a solid, slag forming fuel such as coal, in pulverized or granular form, and transported in suspension in a high velocity stream of primary combustion air.

The nozzles 21 are arranged in rows in successive upright longitudinal planes as indicated by the positions of nozzles 21 in Fig. 2, and also in successive transverse planes as indicated by the positions of such nozzles in Fig. 1; the nozzles 21 being positioned at the intersections of such planes as will be understood. In each longitudinal plane, a group of three nozzles 21 may be arranged in the manner shown in Fig. 1, with successive nozzles discharging downwardly and forwardly at progressively steeper inclinations at positions progressively nearer the front wall 4. In the transverse planes, the nozzles 21 converge downwardly in symmetrical arrangement toward a central vertical plane midway between and parallel to the side walls 14, 14. Thus, for a group of four burner nozzles in each of said transverse planes, as indicated in Fig. 2 for one such plane, the two intermediate nozzles 21, that is, those nearest adjacent opposite sides of the central plane, are arranged to converge downwardly toward an upper elevation within the furnace, whereas the remaining two outer nozzles of the group converge downwardly toward a lower elevation, also within the furnace.

Secondary air is introduced through nozzles 23 which enter through the sloping roof portions 6a, 6a in two longitudinal rows intermediate the rows of primary air-fuel nozzles 21 at opposite sides of the ridge 15; the nozzles 23 discharging in approximately the same direction as fuel nozzles 21, and being supplied with heated air from an exterior source suitably through branches 24 of a main conduit means 25. As indicated in Fig. 1, the secondary air nozzles 23 are distributed throughout the longitudinal extent of roof 6 whereby certain nozzles 23 nearest the front wall 4 are suitably disposed in staggered relation to fuel nozzles 21 in the nearest adjacent longitudinal rows.

Tertiary air is introduced horizontally through nozzles 26 which open through opposing side walls 13, 13 into upper regions of chamber A, adjacent the sloping roof portions 6a; the nozzles 26 in the respective side walls being arranged in single rows parallel to the length of roof portions 6a and being supplied with air through branches 27 of the main air conduit means 25.

In the operation of a furnace such is disclosed, the fuel-air streams entering through nozzles 21 converge downwardly toward the central plane of symmetry, while the secondary air streams from nozzles 23 converge downwardly in corresponding relation. The tertiary air streams from nozzles 26 enter horizontally from opposite sides adjacent the roof of the furnace and thus coact with the downwardly directed streams through nozzles 21 and 23 to form adjacent flame cylinders whirling in opposite directions as indicated by lines B, B which represent in general the rotational paths of movement. The lines B, B may further be regarded as delineating imaginary cylinders to which the respective fluent streams are tangent so as to promote rotational movement of the buring fuel-air bodies in opposite directions about horizontal parallel axes, and with adjoining portions of both vortiginous flame bodies moving in a common downward direction adjacent the central plane of symmetry.

For operation at partial load, the nozzles 21, 23 and 26 located at one side of the central plane may be shut off and only the corresponding nozzles at the opposite side left in operation to provide a single cylindrical flame path. With nozzles 21 and 23 at only one side in operation, and tertiary air nozzles 26, 26 at both sides, two vortiginous flame bodies will again be formed, thereby providing a condition best adapted for the ignition of additional fuel when nozzles 21, 23 at the opposite side are placed in operation.

Fig. 3 shows a modified form of slagging furnace in which a combustion chamber C is especially arranged for the maintenance of four vortiginous flame bodies D in symmetrical arrangement about a central vertical plane as indicated. In vertical section, as viewed from one end, the furnace chamber C is continuous between parallel vertical side walls 31, 31 and furthermore is composed of two equal sections Ca and Cb disposed in symmetrical arrangement relative to a vertical plane midway between walls 31, 31. Each furnace section has a lower wall or floor formed with oppositely inclined portions 32, 32 converging downwardly to provide therebetween a slag trough 34 along which slag may flow toward a bottom outlet, not shown. The upper boundary wall of each furnace section is formed with oppositely inclined roof portions 35, 35 converging upwardly to provide ridges 36 vertically above the troughs 34. The furnace chamber sections Ca and Cb are thus of equal hexagonal cross section, with both having their inner vertical sides open to provide intercommunication therebetween. In vertical section, along each ridge 36, the respective furnace chamber sections Ca, Cb may suitably be of the form shown in Fig. 1 for chamber A and thus provide a combustion space of progressively increasing cross section toward its gas outlet end. Slag is discharged from troughs 34 through a similar slag outlet 10.

Primary air-fuel streams are admitted to the respective chamber sections through rows of nozzles 37 which converge downwardly in symmetrical arrangement relative to vertical planes passing through the central ridges 36. Secondary air is introduced through nozzles 38 which are disposed in the vertical planes of ridges 36 and thus discharge downwardly in converging relation to the primary air-fuel streams from nozzles 37. Tertiary air is introduced through nozzles 39 which are inclined downwardly toward the vertical planes of secondary air nozzles 38 and which furthermore are disposed in longitudinal rows at the outer sides of primary air-fuel nozzles 37 in their respective rows. With fuel and air nozzles arranged in the manner disclosed, and with all such nozzles in operation, a total of four vortiginous flame bodies D are formed as indicated in Fig. 3. At partial load, a symmetrical arrangement of two flame bodies may also be maintained, in which case the resulting flame bodies are of approximately elliptic form, with their major axes in horizontal alignment, whereby the total interior furnace space C is utilized to best advantage. Accordingly, the total furnace space C, in vertical section transversely of its lateral boundaries 31, 31, may also be of corresponding elliptic form.

As will be understood, furnaces similar to those herein disclosed are also adapted for operation with the vortiginous flame bodies formed about axes which are either horizontally or vertically disposed or inclined from either a horizontal or vertical direction. The vertical arrangement has an advantage in that the cross sectional area of the interior furnace space can be decreased or increased from all sides without interrupting the flow of slag along walls of the chamber.

While in accordance with the provisions of the statutes I have illustrated and described herein a specific form of the invention now known to me, those skilled in the art will understand that changes may be made in the form of the apparatus disclosed without departing from the spirit of the invention covered by my claims, and that certain features of the invention may sometimes be used to advantage without a corresponding use of other features.

What is claimed is:

1. A furnace for burning slag-forming fuel and having walls defining a combustion chamber of symmetrical formation relative to a central vertical plane extending longitudinally of and between two of said walls which constitute vertical side walls of said chamber, said chamber being formed with adjoining combustion zones of equal form and volume respectively at opposite sides of said plane, said furnace walls including an upper and a lower wall arranged transversely of said plane and determining with said side walls said symmetrical formation, nozzles disposed in rows parallel to said plane and opening through said upper wall at opposite sides of said plane for delivering a fuel-air mixture into said zones along axes converging downwardly toward said plane, other nozzles opening through said upper wall at opposite sides of said plane intermediate said rows of fuel-air nozzles at each side of said plane for admitting secondary air into said zones in streams adjacent said fuel-air streams and in approximately common directions therewith, and additional nozzles arranged in rows at the outer sides of said other nozzles and opening into said zones at opposite sides of said plane for releasing tertiary air into upper portions of said zones, all of said nozzles being arranged to cause said fuel-air mixture and said air to be released into said zones in streams directed in tangential relation to imaginary cylinders formed within the respective zones to effect the formation of vortiginous flame bodies of opposite rotation therein, said furnace having an upper gas outlet leading from one end of said furnace at a location horizontally removed in its entirety from locations at which all of said nozzles open into said furnace.

2. A furnace for burning slag-forming fuel and having walls defining a combustion chamber of symmetrical pentagonal formation relative to a central plane extending longitudinally of and between two of said walls which constitute upright side walls of said chamber, said furnace walls including an upper wall and a lower wall respectively forming the roof and floor of said chamber, upright walls arranged transversely of said central plane and respectively forming the front wall and the rear wall of said chamber, said roof sloping upwardly toward said rear wall and terminating in spaced relation to said rear wall to define a gas outlet opening from an upper end portion of said chamber, nozzles disposed in rows parallel to said plane and opening through said roof in separate rows respectively adjacent opposite sides of said plane for delivering a fuel-air mixture into said chamber along axes inclined toward and intersecting said plane at positions intermediate said floor and said roof, other nozzles opening through said roof in rows adjacent said separate rows of nozzles for admitting secondary air into said chamber in approximately a common direction with said fuel-air mixture, and additional nozzles opening through each of said side walls for directing tertiary air into said chamber in streams flowing adjacent said roof in the direction of said central plane, said additional nozzles being further arranged to direct said streams of tertiary air in tangential relation to imaginary cylinders formed at the corresponding sides of said plane to effect the formation of vortiginous flame bodies of opposite rotation at said sides, with both bodies having a common downward direction of movement at said plane, said first named nozzles being arranged to direct the fuel-air mixture in tangential relation to said imaginary cylinders at peripheral locations adjacent said central plane, all of said nozzles opening into said furnace at locations horizontally removed in the direction of said front wall from the foremost margin of said upper gas outlet.

3. A furnace as defined in claim 2 wherein said roof is of gabled formation to provide oppositely inclined side portions diverging downwardly from a ridge portion along said central plane, said nozzles which open through said roof being arranged in rows more nearly adjacent to said ridge than to said side walls.

4. A furnace for burning slag-forming fuel and having walls defining a combustion chamber of symmetrical formation relative to a central plane extending longitudinally of and between two of said walls which constitute upright side walls of said chamber, said furnace walls including an upper and a lower wall arranged transversely of said plane and determining with said upright side walls said symmetrical formation, nozzles disposed in rows parallel to said plane and opening through said upper wall at opposite sides of said plane for delivering fuel-air streams into said chamber along axes inclined toward and intersecting said plane at positions intermediate said upper and lower walls, other nozzles opening through said upper wall at opposite sides of said plane for admitting secondary air into said chamber in streams adjacent said fuel-air streams and in approximately common directions therewith, and additional nozzles opening through each of said upright side walls at positions adjacent said upper wall and arranged to direct tertiary air into said chamber in streams flowing adjacent said upper wall in the direction of said central plane, said additional nozzles at the respective sides of said central plane being arranged to direct the streams of tertiary air in tangential relation to imaginary cylinders formed at the corresponding sides of said central plane about axes arranged parallel to one another and to said plane, said nozzles through which said fuel-air streams are delivered being arranged to direct said fuel-air streams in tangential relation to said imaginary cylinders at peripheral locations adjacent said central plane, said furnace having an upper gas outlet leading from one end of said furnace at a location horizontally removed in its entirety from locations at which all of said nozzles open into said furnace.

5. A furnace for burning slag forming fuel which comprises walls defining a pair of combustion chambers in adjoining communicating relationship, each combustion chamber including a roof having a central ridge portion from which opposite side portions slope downwardly, a floor having a central ridge portion from which opposite side portions slope upwardly, a series of longitudinally spaced fuel nozzles disposed on opposite sides of said roof ridge portion, a series of longitudinally spaced air nozzles disposed intermediate said fuel nozzles, and additional longitudinally spaced air nozzles disposed on opposite sides of said roof ridge portion and outwardly of said fuel nozzles, the nozzles on either side of said ridge portion having convergently related axes and being arranged to introduce streams of air and fuel into the upper portion of the combustion chamber substantially tangentially to an imaginary horizontally disposed cylinder thereby effecting the formation of whirling burning fuel-air streams of opposite rotation within the combustion chamber.

6. Apparatus for burning slag forming fuel comprising wall means forming a horizontally elongated combustion chamber of generally symmetrical formation about a central longitudinal plane, means forming a substantially restricted gas outlet in the upper portion and at one end of said chamber, means forming a restricted slag outlet in the lower portion of said combustion chamber for the continuous discharge of molten slag, means for burning a slag-forming solid fuel in said chamber under a mean chamber temperature above the fuel ash fusion temperature including a series of longitudinally spaced fuel nozzles opening into the upper portion of said chamber on opposite sides of said plane, and a series of longitudinally spaced air nozzles opening into the upper portion of said chamber on opposite sides of said plane and intermediate said fuel nozzles, the nozzles on either side of said plane having convergently related axes and being arranged to introduce streams of fuel and air into the upper portion of said chamber substantially tangentially to an imaginary horizontally disposed cylinder thereby effecting the formation of whirling burning fuel-air streams of opposite rotation within the combustion chamber.

7. Apparatus for burning slag forming fuel comprising wall means forming a horizontally elongated combustion chamber of generally symmetrical formation about a central longitudinal plane, means forming a substantially restricted gas outlet in the upper portion and at one end of said chamber, means forming a restricted slag outlet in the lower portion of said combustion chamber for the continuous discharge of molten slag, means for burning a slag forming solid fuel in said chamber under a mean chamber temperature above the fuel ash fusion temperature including a series of longitudinally spaced fuel nozzles opening into the upper portion of said chamber on opposite sides of said plane, a series of longitudinally spaced air nozzles opening to the upper portion of said chamber on opposite sides of said plane and intermediate said fuel nozzles, the nozzles on either side of said plane having convergently related axes inclined toward the opposite end of said chamber and being arranged to introduce streams of air and fuel into the upper portion of said chamber substantially tangentially to an imaginary horizontally disposed cylinder thereby effecting the formation of whirling burning fuel-air streams of opposite rotation within the combustion chamber, and additional longitudinally spaced air inlets arranged to direct air streams into said chamber at positions downstream from said fuel and air nozzles and in directions promoting the whirling motion of the oppositely rotating burning fuel-air streams.

References Cited in the file of this patent

UNITED STATES PATENTS

| | | |
|---|---|---|
| 1,606,720 | Pollock | Nov. 9, 1926 |
| 1,734,669 | Frisch | Nov. 5, 1929 |
| 1,776,841 | Murray | Sept. 30, 1930 |
| 1,943,286 | Burg | Jan. 16, 1934 |
| 1,966,054 | Wheeler | July 10, 1934 |